Figure 1:
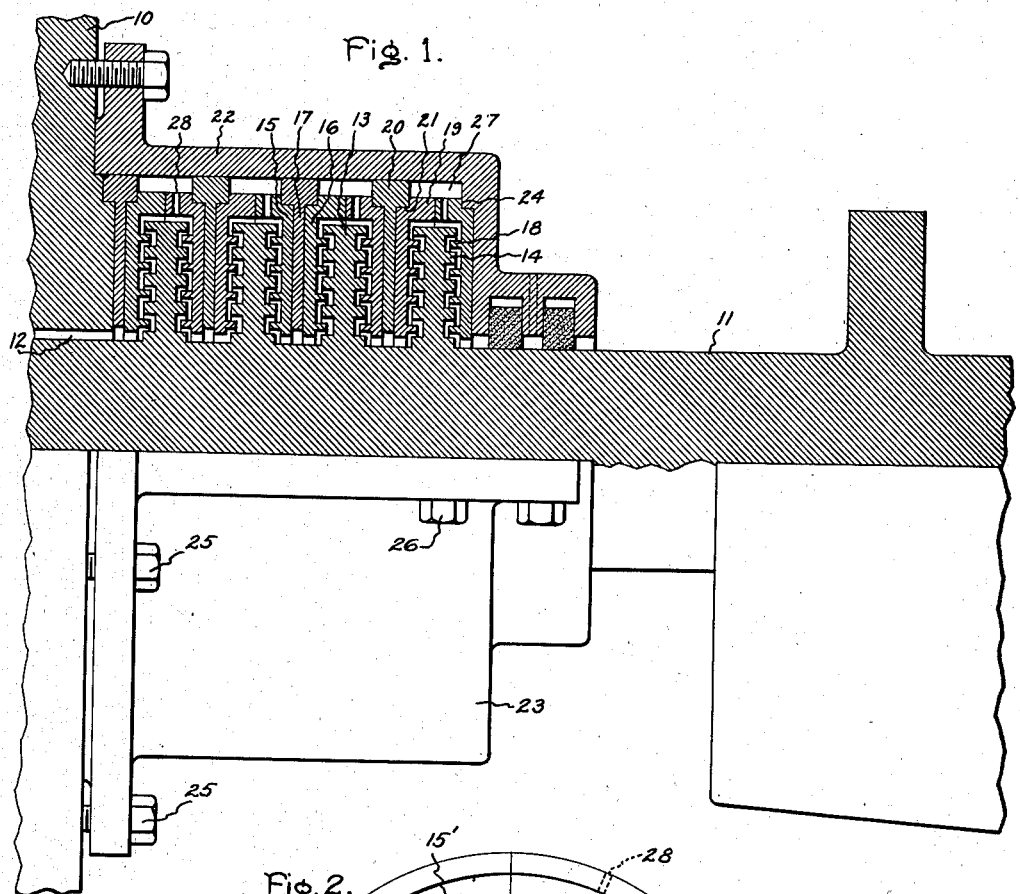

May 23, 1939.  A. J. LARRECQ  2,159,766

LABYRINTH PACKING

Filed April 15, 1938

Inventor:
Anthony J. Larrecq,
by Harry E. Dunham
His Attorney.

Patented May 23, 1939

2,159,766

UNITED STATES PATENT OFFICE 2,159,766

LABYRINTH PACKING

Anthony James Larrecq, Beachbluff, Mass., assignor to General Electric Company, a corporation of New York Application April 15, 1938, Serial No. 202,277

11 Claims. (Cl. 286—10)

The present invention relates to shaft packings of the labyrinth type particularly applicable for use with elastic fluid turbines. Packings of the type referred to usually comprise a plurality of radially extending packing elements or disks provided on the shaft of the rotating element which disks are provided on opposite sides with a plurality of axially extending annular rings. The stationary packing elements are also disk-like in shape and are provided on opposite sides with axially extending annular rings. These stationary packing elements are so mounted on the casing structure and extend radially between the rotating elements that the rings of the adjacent faces intermesh forming a tortuous passage to baffle the flow of the fluid, the leakage of which it is desired to prevent.

This type of packing is particularly desirable because of the relatively short axial length for a given number of throttling points. But in providing packings of this type for elastic fluid turbines operating with high temperature and high pressure elastic fluid of the order of 1200 pounds or more, difficulties are encountered in effecting a suitable seal. Heretofore in packings of this type the radial elements to be carried by the shaft have each been formed with individual sleeves which sleeves were then slipped over the end of the shaft and shrunk into position as alternate stationary and rotatable elements were assembled. In the operation of the turbine, owing to unequal ratios of expansion of the different parts, the sleeves of the rotating elements previously shrunk onto the shaft become loose and permit leakage of elastic fluid along the shaft. It will be readily understood that the loosening occurs particularly during the starting of the turbine as the rotating packing elements which are in direct contact with the high temperature fluid heat up more rapidly than the shaft. Although the clearance between the shaft and the inner packing member which is due to this unequal expansion is small, it will permit under the high pressure conditions in modern turbines a substantial loss of fluid. This leakage of high temperature fluid also frequently causes warping of the shaft and consequent turbine vibration.

It is an object of this invention to provide a shaft with a plurality of integrally connected radial packing disks, which disks are provided on opposite sides with axially extending rings adapted to be intermeshed by cooperating rings of demountable stationary packing elements.

It is a further object of this invention to provide a new and improved arrangement of stationary packing elements for use in a labyrinth packing of the type described, which stationary elements may be readily assembled, and securely fastened in position.

For a consideration of what I believe to be novel and my invention, attention is directed to the following description and the claims appended thereto in connection with the accompanying drawing.

Figure 2:
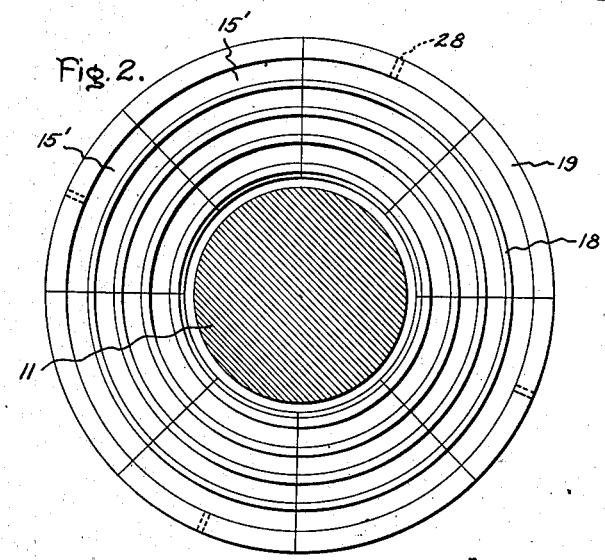

Referring to the drawing, Fig. 1 is a longitudinal view, partly in section, of a shaft packing embodying my invention and Fig. 2 is a plan view showing in detail one of the stationary packing elements.

For the purpose of illustration, I show my novel labyrinth packing applied for sealing the space between the shaft opening of a turbine and the shaft extending therethrough. Obviously, it may be applied to any relatively rotatable members.

Referring to Fig. 1 of the drawing, 10 indicates a turbine casing and 11 the turbine shaft extending through an opening 12 therein. A plurality of axially spaced apart and radially extending disks or packing elements 13 are formed integrally with the shaft each provided on opposite sides with a plurality of axially extending annular rings 14. The stationary packing units include disk elements 15 and 16, substantially identical in construction, arranged between adjacent rotating elements back to back with spacer disks 17 therebetween. The stationary packing elements are provided on their faces with a plurality of axially extending annular rings 18 spaced apart upon the surface so as to intermesh between the annular rings 14 of the rotating elements when in assembled position. The stationary elements are provided at their peripheries with flange rings 19 extending axially from the face surfaces. The flange rings of the stationary disks assembled on opposite sides of a shaft packing element are adapted to abut against each other around the edge of the shaft element thereby insuring the proper clearance between the relatively movable elements, which clearance may be determined by the width of the flange rings.

The stationary packing elements 15 or 16 are divided into a plurality of sectors 15' as shown in Fig. 2 to permit the assembly of the elements within the space between the rotatable elements and around the shaft. After a pair of stationary disks such as 15 and 16 have been assembled back to back in position about the shaft and between two adjacent rotatable disks, the spacer disk 17 is inserted therebetween to wedge them axially apart so as to cause an intermeshing of the annular rings 18 thereof with the annular rings 14 of the rotatable elements 13. The spacer disks are also suitably sectored similar to the stationary packing elements to facilitate the assembly thereof about the shaft.

The spacer disks may be provided at the outer edges with rims 20 which extend axially upon both sides thereof. As shown, the inner edges of these rims are adapted to seat within annular grooves 21 formed in the peripheries of the stationary packing disks. The entire assembly of stationary parts may be secured in position by means of the housing parts 22 and 23 fitted thereover. The shoulder 24 provided on the inner end wall of the housing fits into the peripheral groove of the outermost stationary packing element to retain the sectors of this element in position. As the housing is fastened, as by bolts 25, to the end wall of the turbine casing 10, the stationary packing parts are rigidly clamped between the end wall of the housing and the turbine casing. The outer surfaces of the rims 20 extending from the spacer disks are engaged by the inner walls of the housing so as to preclude radial shifting of the sectors making up the spacer disks. Accordingly, the sectors of the stationary packing disks are also thereby securely retained in the proper position.

It is desirable to provide annular spaces or chambers such as 27 between the stationary packing elements and the inner wall of the housing into which chambers the heated elastic fluid may pass for the purpose of expanding the entire assembly of parts uniformly upon starting of the turbine and for effecting a more efficient seal. Apertures 28 may be provided in the rims of one or more of the sectors of the stationary packing disks for conducting elastic fluid from the shaft passage into such annular chambers.

By the arrangement shown it is readily seen that the packing may be easily disassembled for inspection or repair without removing the rotor from the casing or even without removing the upper half of the turbine casing. By removing the housing parts 22 and 23, the spacer disks may be withdrawn which will then allow the stationary packing disks to be moved axially and the rings thereof to be withdrawn from the intermeshing position. The packing disks may be then removed by sectors radially outward from between the shaft elements.

While I have described the rotatable packing elements as being formed integrally with the shaft, it is obvious that these elements may be formed integrally upon a separate sleeve. The sleeve may be fitted onto the shaft in any suitable manner so as to permit replacement in the event of serious damage thereto. The sleeve, for example, may be removably secured to the shaft in a manner similar to that shown in Patent 1,895,930, Junggren, assigned to the General Electric Company, so as to preclude leakage of fluid between the sleeve and the shaft.

While I have shown my invention in but one modification, it will be obvious to those skilled in the art that it is susceptible of various changes without departing from the spirit thereof and I desire, therefore, to have it understood that the arrangement shown is only illustrative and that I intend by the appended claims to include all such modifications as fall within the true spirit of the invention.

What I claim as new and desire to secure by Letters Patent of the United States is:

1. In combination, a casing, a shaft extending through an opening in said casing, a labyrinth packing for said opening comprising a plurality of axially spaced apart disk packing elements integrally connected together and mounted on said shaft, stationary packing units each comprising a pair of disks for assembly between adjacent shaft elements, means for spacing said disks of each stationary packing unit axially apart, peripheral rims provided on said stationary packing disks for engaging over the edge of said shaft elements and spacing said stationary packing disks from said shaft elements, a housing for said packing assembly, a plurality of annular chambers provided between said housing and said stationary packing units and passages through said rims communicating with said annular chambers.

2. In combination, a casing, a shaft extending through an opening in said casing, a labyrinth packing for said opening comprising a plurality of axially spaced apart disk packing elements provided on said shaft, said elements being provided on the sides with a plurality of axially extending concentric rings, stationary packing units for assembly between adjacent shaft elements, each stationary packing unit comprising a pair of sectored disks, said disks being provided on the face surfaces with a plurality of axially extending concentric rings, a peripheral rim extending from the face surface of each of said pair of disks, means for spacing said disks of each stationary packing unit axially apart in intermeshing relationship with said shaft elements, the peripheral rims of stationary packing disks on opposite sides of each shaft element engaging over the edge of said shaft elements for spacing said stationary packing disks from said shaft elements, a housing for clamping said packing assembly to said casing and means between said housing and said stationary packing disks for precluding radial shifting of the sectors of said disks.

3. In combination, a casing, a shaft extending through an opening in said casing, a labyrinth packing for said opening comprising a plurality of axially spaced apart disk packing elements formed integrally together on said shaft, said elements being provided on facing sides with a plurality of axially extending rings, a stationary packing unit comprising a pair of sectored disks for assembly between a pair of said shaft elements, said disks being provided on the face surfaces with a plurality of axially extending rings, a sectored spacer disk for spacing the stationary packing disks of said pair axially apart so that the rings on the faces thereof intermesh with the rings of said shaft elements, means including said spacer disk for precluding radial shifting of said stationary packing elements, a housing for said packing assembly for precluding shifting of said spacer disk sectors.

4. In combination, a casing, a shaft extending through an opening in said casing, a labyrinth packing for said opening comprising a plurality of axially spaced apart disk packing elements formed integrally on said shaft, said elements being provided on facing sides with a plurality of axially extending rings, a stationary packing unit comprising a pair of sectored disks for assembly between adjacent shaft elements, said sectored disks being provided on one side with a plurality of axially extending rings, a sectored spacer disk for spacing said stationary packing elements in intermeshing relationship with said shaft elements, said spacer disk having a peripheral rim extending axially on both sides thereof, the inner surface of said rim engaging said stationary packing disks, a housing fitted over said packing assembly and engaging the outer surface of said spacer disk rim.

5. In combination, a casing, a shaft extending through an opening in said casing, a labyrinth packing for said opening comprising a plurality of axially spaced apart disk packing elements provided on said shaft, said elements being provided on opposite sides with a plurality of axially extending concentric rings, stationary packing units for assembly between adjacent shaft elements, each stationary packing unit comprising a pair of sectored disks, said disks being provided on the face surfaces with a plurality of axially extending concentric rings, a peripheral rim extending axially from the face surface of each of said pair of disks, a sectored spacer disk for spacing said disks of each stationary packing unit axially apart in intermeshing relationship with said shaft elements, the peripheral rims of stationary packing disks on opposite sides of each shaft element engaging over the edge of said shaft elements for spacing said stationary packing disks from said shaft elements, and means for securing said stationary packing elements.

6. In combination, a casing, a shaft extending through an opening in said casing, a labyrinth packing for said opening comprising a plurality of axially spaced apart disk packing elements integrally connected together and mounted on said shaft, the faces of said elements being provided with a plurality of axially extending concentric rings, a stationary packing unit comprising a pair of sectored disks for assembly between a pair of said shaft elements, said sectored disks being provided on one side with a plurality of axially extending concentric rings, a sectored spacer disk for spacing said stationary packing disks in intermeshing relationship with said shaft elements and means for securing said stationary packing unit and said spacer disk to said casing.

7. In combination, a casing, a shaft extending through an opening in said casing, a labyrinth packing for said opening comprising a plurality of axially spaced apart disk packing elements provided on said shaft, said elements being provided on opposite sides with a plurality of axially extending concentric rings, stationary packing units for assembly between adjacent shaft elements, each stationary packing unit comprising a pair of sectored disks, said disks being provided on the face surfaces with a plurality of axially extending concentric rings, means for spacing said disks of each stationary packing unit axially apart in intermeshing relationship with said shaft elements, means on said stationary packing disks for spacing said stationary packing disks from said shaft elements and means for securing said stationary packing units.

8. In combination, a casing, a shaft extending through an opening in said casing, a labyrinth packing for said opening comprising a plurality of axially spaced apart disk packing elements integrally connected together on said shaft, said elements being provided on opposite sides with a plurality of axially extending concentric rings, stationary packing units for assembly between adjacent shaft elements, said stationary packing units each comprising a pair of sectored disks, each of said disks being provided on the face surfaces with a plurality of axially extending concentric rings, sectored spacer disks for spacing the disks of each of said pair axially apart into intermeshing relationship with said shaft elements, means for securing said stationary packing elements and said spacer disks to said casing in spaced relationship with respect to said shaft elements.

9. A labyrinth packing for shaft openings comprising a plurality of axially spaced apart rotatable disk packing elements, a stationary packing unit for assembly between adjacent rotatable elements, said packing unit comprising a pair of sectored disks and means for spacing said sectored disks axially apart and means provided on said sectored disks for retaining said stationary packing unit in spaced relationship with respect to said rotatable packing elements during the normal operative position of the latter.

10. A labyrinth packing for shaft openings comprising a plurality of spaced apart rotatable packing elements rigidly secured together, stationary packing units for assembly between adjacent rotatable elements and into cooperative relationship therewith, each of said packing units comprising a pair of sectored disks, means for spacing the disks of each pair axially apart, and means provided on said sectored disks for spacing said sectored disks with respect to said rotatable packing elements during the normal operative position of the latter.

11. A labyrinth packing for shaft openings comprising a plurality of spaced apart rotatable packing elements integrally connected together, stationary packing units between adjacent rotatable elements, each of said packing units comprising a pair of sectored disks, means for spacing the disks of each pair axially apart into cooperative relationship with said rotatable elements, means provided on said sectored disks for spacing said packing units with respect to said rotatable elements during the normal operative position of the latter and a housing fitted over said packing for securing said stationary packing units in position.

ANTHONY JAMES LARRECQ.